Patented May 23, 1944

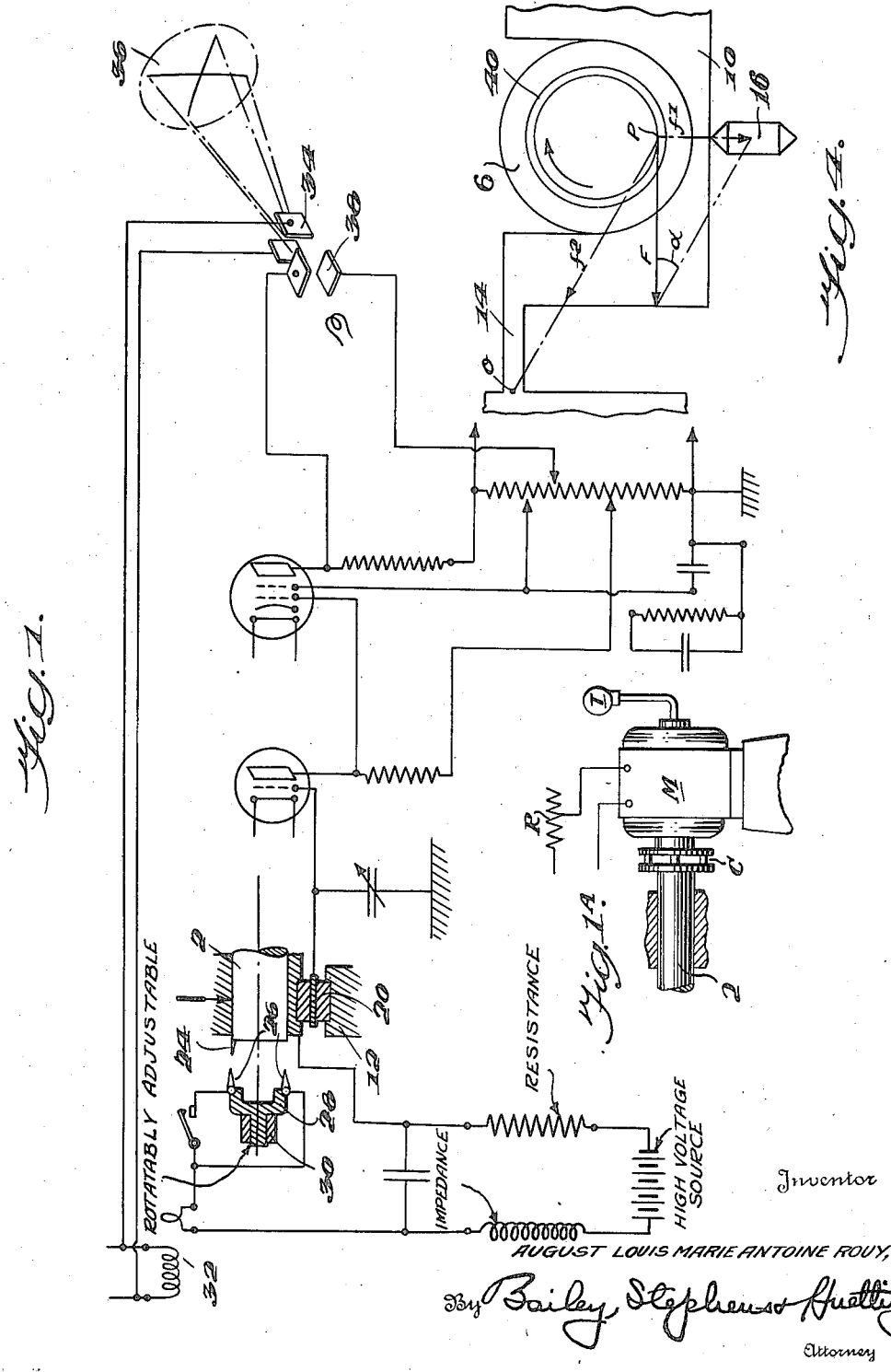

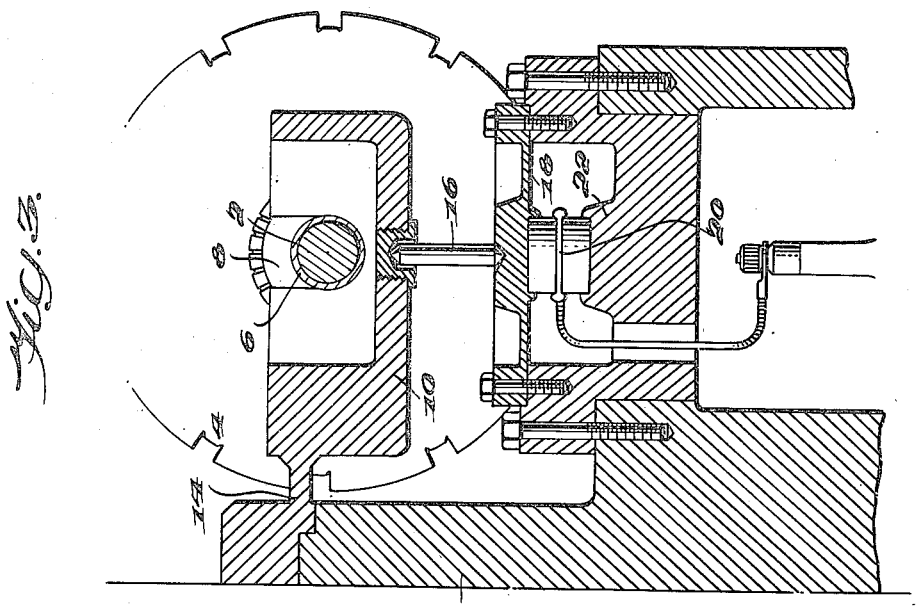
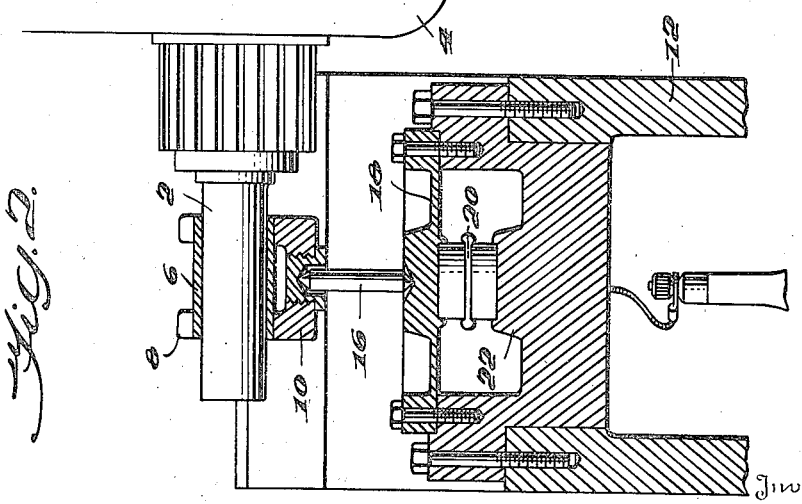

2,349,563

UNITED STATES PATENT OFFICE 2,349,563

LUBRICANT TESTING METHOD AND APPARATUS

Auguste Louis Marie Antoine Rouy, New York, N. Y., assignor to The Gyro-Balance Corporation, Greenwich, Conn., a corporation of Delaware Application August 30, 1941, Serial No. 409,079

7 Claims. (Cl. 265—10)

The invention relates to a method and apparatus for testing lubricants, especially lubricating oils. It is especially directed to discovering the coefficient of friction and the film forming properties of oils used in the bearings of rotating shafts.

The primary object of the invention is to provide an accurate method and apparatus for measuring the frictional properties of a lubricant.

Another object of the invention is to provide a method of this nature which is quick and simple, and, therefore, economical.

Still another purpose is to provide a method for selecting, for a bearing and shaft of given characteristics, the lubricant best suited for such bearing and shaft.

An additional object of the invention is to provide a procedure for determining the angular velocity at which, with a given bearing and shaft, any selected lubricant will form a continuous film, or will attain proper lubricating conditions.

Still a further purpose of the invention is to make it possible to determine the properties of a lubricant when a shaft lubricated therewith is rotating at high speeds, and is operating under conditions of load and temperature similar to those to which it will be subjected when in actual use.

Another object of the invention is to provide a mode of measuring the characteristics of a lubricant during the stopping of a shaft lubricated thereby.

The method in general consists in rotating a balanced shaft which is lubricated by the material to be tested, and measuring instantaneously the variations in the forces acting on the shaft. From these forces the coefficient of friction under varying conditions can be determined.

Further objects and advantages will be seen from the following description when taken in conjunction with the accompanying drawings, which form a part thereof.

In the drawings:

Fig. 1 shows diagrammatically an apparatus for use in carrying out the invention.

Figure 1A is a diagrammatic view in elevation of one end of the apparatus showing a driving means.

Figs. 2 and 3 are sections at right angles to one another through the shaft mounting and force detecting portions thereof.

Fig. 4 is a diagram of the forces developed on the shaft and bearing.

Figure 5:
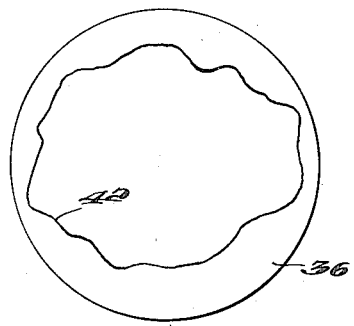
Figs. 5 and 6 are diagrams of types of patterns which form on the screen of the cathode ray tube.

One form of apparatus for use in carrying out the process is shown in Figs. 1 to 3 and is described in more detail in my prior application S. N. 266,714, filed April 7, 1939, which has matured as United States Patent No. 2,329,654, September 14, 1943.

A shaft 2 of a rotor 4 is mounted at its ends, in bearings such as 6 (see Figs. 2 and 3). These bearings fit in notches 8 formed in a support 10. This support is connected to the frame 12 of the machine by a portion 14, which is vertically flexible but is so constructed and arranged that lateral movement of the shaft with respect to the frame is prevented.

The rotor shaft 2 is driven by any suitable means such as, for example, that illustrated in Fig. 1A of the drawings. In this figure the shaft is coupled to a driving motor M by means of any type of flexible coupling designed to prevent the transmission of stray oscillations to the shaft, and the speed of the motor may be regulated by means of the rheostat R. The speed of the motor may be determined at any time by means of a suitable tachometer T Support 10 has in its bottom wall a seat for the upper end of a pin 16, pointed at both its ends. The lower end of this pin rests in a seat in a flexible diaphragm 18 which rests on a piezo-electric crystal 20, formed of a layer of quartz between two iron plates. This crystal in turn rests on a support 22 rigid with frame 12. As all the parts are substantially incompressible, the support 10 for the shaft is effectively prevented from moving downwardly to any measurable extent with respect to the frame, but all forces exerted thereon are transmitted to the piezoelectric crystal 20.

On one end of shaft 2 is mounted a pointed terminal or needle-like electrode 24 which, during rotation of the shaft, moves past one or more electrodes 26 on a support 28 mounted for angular adjustment in a frame 30. Thus at each revolution of the shaft the electrode 24 moves past each of the electrodes 26.

Current is supplied to the shaft 2 from a high voltage source through the network indicated at the lefthand end of Figure 1. At each revolution, when electrode 24 moves close to an electrode 26, this current jumps to electrode 26 and thence, through a suitable circuit including transformer 32, energizes the vertical plates 34 of a cathode ray tube, so as to cause the ray of this tube to move horizontally across the screen 36.

Piezoelectric crystal 20 is connected through an amplifying system to the horizontal plates 38 of the same cathode ray tube, so that a force exerted by the shaft causes vertical deviation of the ray thereof.

As described in my prior patent above referred to, this mechanism is used for determining the unbalance of a shaft. As so used, there is obtained on the screen 36 a vertical line and one or more horizontal lines, forming a sort of H. This results from the fact that the unbalance force is synchronized with the rotation of the shaft so that, for any given position of electrodes 26, the transverse impulse produced thereby occurs at the same point in the vertical movement of the ray produced by the constantly recurring unbalance force.

The present invention starts with a shaft or rotor which has been accurately balanced in accordance with the method described in my aforesaid application, with this apparatus, or in some other suitable manner.

A shaft 2 which has been corrected for accurate balance and mounted in a bearing 6 is lubricated with the lubricant to be tested, and is rotated at the same speeds and under the same loads as it will be subjected to when in actual use. The temperature conditions may also be adjusted to simulate those expected in practise.

Referring now to Fig. 4, the friction of the oil layer 40 causes the shaft 2 to exert on the bearing 6 a force F which is horizontally directed through the lowest point $p$ of the shaft 2. This force may be resolved into two components, one $f2$ directed along a line joining point $p$ with the center of flexion $o$ of the flexible member 14, which is the point about which the bearing tends to move under the action of force F, this line forming an angle $\alpha$ with the horizontal; and a vertical force $f1$. Force $f2$ is rendered ineffective by the mounting of the shaft, while force $f1$ is transmitted by pin 16 to the piezoelectric element 20. Thus, variations in the force $f1$ cause variations in the energization of the horizontal plates 38 of the cathode ray tube, and will produce deviations of the beam thereof.

By applying a force of known value along the line of force F, and noting the resulting reading on the screen of the tube, the deviation caused by a given force can be determined. From this, the value of the friction and thereby the coefficient of friction can be found.

The same result can be obtained by determining the vertical force $f1$, by suitable calibration of the instrument controlled by the piezoelectric crystal 20, and multiplying this value by the cotangent of angle $\alpha$, this angle being constant in any given test because of the rigid support of carrier 10 by pin 16.

Figure 6:
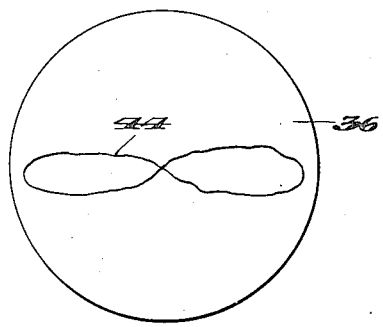

Because the force produced by the friction is continuous, though somewhat variable (and not periodically reversed in synchronism with the rotation of the shaft, as in the case of an unbalancing mass), the pattern resulting on the screen will take a form generally similar to one of those shown in Figs. 5 and 6. In Fig. 5, the frictional forces are high and a pattern enclosed by the line 42 results. The area of this pattern is proportional to the average friction. With a better lubricant, on the other hand, a pattern such as 44 of Fig. 6 is obtained, generally in the form of a lemniscate. Since the areas on opposite sides of the center are nearly equal, and since these areas are of opposite sign, their difference is very small and indicates that the frictional force and therefore the coefficient of friction are very low. In other words, a satisfactory lubricant for the particular type of shaft and bearing has been found.

Figure 7:
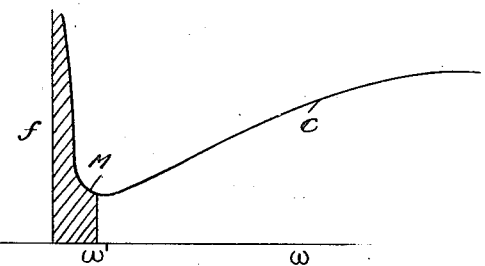
Figs. 7 and 8 are diagrams used in explaining the invention.

The invention may be used to indicate very exactly the angular speed at which the oil forms a continuous film. At low speeds, the oil film is not continuous and friction is high. By gradually increasing the speed of a balanced shaft in the manner discussed above, and plotting the force $f$ against the angular speed $\omega$, a curve $c$ such as that shown in Fig. 7 is obtained. It will be noted that the force is high at the beginning, rapidly drops to the point M, and then slowly increases. The shaded portion of the curve represents the dangerous speeds at which no oil film is present, and point M shows the angular speed $\omega'$ at which the oil film is formed.

Figure 8:
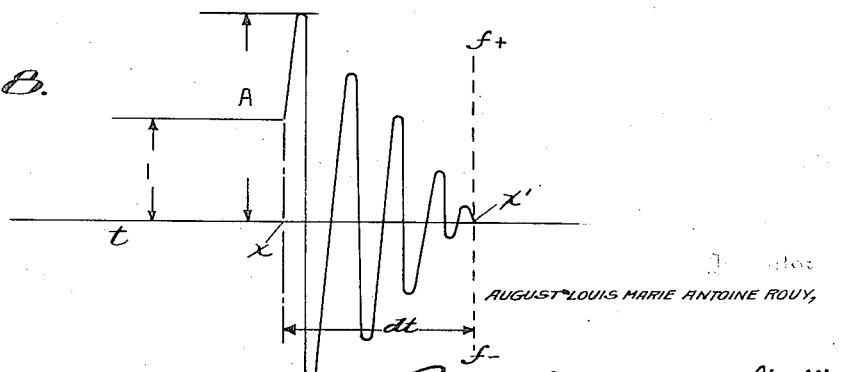

Measurements of the frictional forces which arise when a shaft stops are also possible. As shown in Fig. 8, in which the force is plotted as the ordinate against time $t$, during the period $dt$, beginning at point $x$, when the shaft is slowing down from a speed at which the average frictional force had been F, the force of friction fluctuates rapidly while reversing its direction until the shaft stops at point $x'$. The value A of the maximum fluctuation is an indication of the lubricating properties of the oil, and is smaller as the oil is better.

Figure 9:
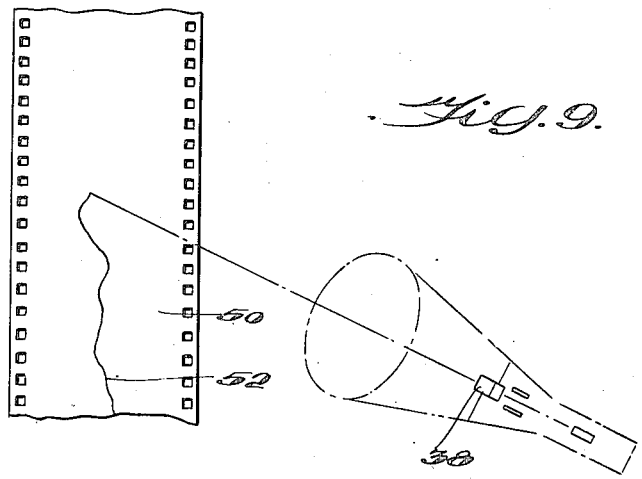
Figs. 9 and 10 show modified devices for use in carrying out the method of the invention.

Fig. 9 shows a modified form of apparatus for carrying out the invention. The cathode ray tube by plates 38 directs its ray on a moving sensitive film 50, thus tracing thereon a line 52. The film is synchronized with the rotation of the shaft, so that the deviations produced by the frictional force can be measured.

Figure 10:
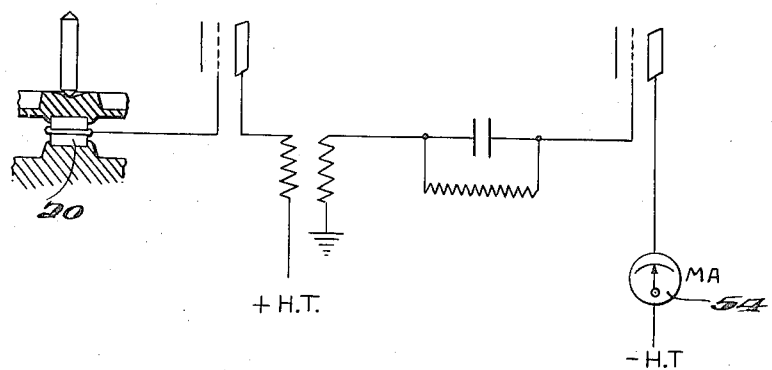

Fig. 10 shows still another apparatus in which the currents generated by piezoelectric crystal 20 are amplified by a suitable circuit and fed to a milliammeter 54, the readings of which vary proportionately to the force of friction.

The method is equally applicable to other types of bearings, such as ball bearings or roller bearings.

As employed in the present specification and claims, the terms "balanced shaft," "balanced rotor" or the like are intended to designate masses which have been placed in accurate balance and tested as by means of the device described in the applicant's copending application to which reference has already been made. The terms also have especial reference to such masses from which all dynamic unbalance has been eliminated.

While I have described herein some embodiments, I wish it to be understood that I do not intend to limit myself thereby, except within the scope of the appended claims.

I claim:

1. A method of measuring the lubricating characteristics of a lubricant, which comprises applying the lubricant between a bearing and a balanced shaft supported therein, starting the rotation of the shaft and gradually increasing the angular speed thereof, measuring during such starting and rotation the force of friction caused by rotation of the shaft and measuring the speed of rotation at each measurement of force, to determine the angular speed at which such force is least and thereby the angular speed at which the oil forms a continuous film between the bearing and shaft.

2. A method of measuring the lubricating characteristics of a lubricant, which comprises supporting a substantially perfectly balanced rotor in a bearing, applying the lubricant between the bearing and the balanced rotor, applying power to said rotor to rotate the same, cutting off said power and allowing said rotor to freely decelerate, and measuring the fluctuations of frictional forces set up in the bearing during the period of deceleration.

3. Apparatus for testing the lubricating properties of lubricants which comprises, in combination, a frame, bearings mounted on said frame, a balanced rotor supported for rotation in said bearings, means for driving said rotor, the relatively rotating surfaces of said rotor and said bearing constituting housing means for the lubricant being tested, a mechano-electric transducer operatively connected with at least one of said bearings and subject to at least a proportional part of the stresses set up in said bearings by rotation of the rotor therein, and indicating means actuated by said transducer for yielding a measure of the forces of friction between the relatively rotating rotor and bearing surfaces.

4. Apparatus for testing the lubricating properties of lubricants which comprises, in combination, a frame, a bearing member, a balanced rotor supported in said bearing member, means for driving said rotor, the relatively rotating surfaces of said rotor and said bearing member constituting a housing for the lubricant being tested, means for preventing movement of said bearing member with respect to said frame in one diametric plane, means to prevent any substantial movement of said bearing in a plane at right angles to said first named plane, said last named means including a transducer subject to at least a component of the frictional forces set up between said rotor and said bearing member, and indicating means operatively connected with said transducer yielding a measure of said forces.

5. Apparatus for testing the lubricating properties of lubricants which comprises, in combination, a frame, a bearing member connected with said frame by a substantially horizontally extending arm which is subject to slight flexure, a balanced rotor supported in said bearing member, means for driving said rotor, the relatively rotating surfaces of said rotor and said bearing member constituting a housing for the lubricant being tested, a supporting structure for said bearing member disposed beneath the latter, a mechano-electric transducer forming a part of said supporting structure and means actuated by said transducer to indicate the magnitude of the frictional forces between said rotor and bearing surfaces.

6. Apparatus for testing the lubricating properties of lubricants which comprises, in combination, a frame, a bearing member connected with said frame by a substantially horizontally extending arm which is subject to slight flexure, a balanced rotor supported in said bearing member, means for driving said rotor, the relatively rotating surfaces of said rotor and said bearing member constituting a housing for the lubricant being tested, a substantially rigid supporting structure for said bearing member disposed beneath the latter, a substantially incompressible mechano-electric transducer forming a part of said supporting structure and comprising a piezoelectric crystal and means actuated by said transducer to indicate the magnitude of the frictional forces between said rotor and bearing surfaces.

7. A method of measuring the lubricating characteristics of a lubricant which comprises horizontally supporting a substantially perfectly balanced rotor in a bearing against movement in any radial direction except microscopic movement in the direction of one radius of the rotor, lubricating the contacting surfaces of the rotor and bearing with the lubricant to be tested, rotating said rotor, and measuring the component of the frictional forces produced upon said bearing by the rotation of said rotor, which component has a direction substantially parallel with said radius.

AUGUSTE LOUIS MARIE ANTOINE ROUY.